July 31, 1951     J. R. HOLLINS     2,562,273

DIRECTIONAL LAMP SWITCH

Filed March 5, 1949

INVENTOR.
Jesse R. Hollins
BY
ATTORNEY.

Patented July 31, 1951

2,562,273

UNITED STATES PATENT OFFICE 2,562,273

DIRECTIONAL LAMP SWITCH

Jesse R. Hollins, Brooklyn, N. Y.

Application March 5, 1949, Serial No. 79,878

3 Claims. (Cl. 200—11)

This invention relates to vehicle lamp circuits and, more particularly, to a novel switch and associated circuit elements whereby vehicle marker lamps may be utilized as turn indicators.

Automotive passenger vehicles and trucks are equipped with parking lamps and stop lamps, the latter usually being activated by a brake actuated switch. In addition, and particularly in the last few years, these vehicles have been equipped with extra lamps operated by a selector switch to indicate turning movements of the vehicle. These extra lamps and the control switch add to the expense and complexity of the electric lighting system of the vehicle.

In accordance with the present invention, a novel switch is provided, in association with a flasher unit and a pilot lamp, whereby the vehicle parking and/or stop lamps may be selectively "flashed" to indicate a turning movement. To this end, the switch preferably includes circuit closure members normally connecting the parking and stop lamp circuits to their respective control circuits. In addition, the switch has a novel circuit closure member which is arranged normally to be inoperative, but which is selectively operable to energize the parking and/or stop lamps on one or the other side of the vehicle through a circuit including a flasher unit. Thereby, either the left-hand or the right-hand parking and/or stop lamps are "flashed" to indicate a turning movement. At the same time, a pilot or indicator lamp within the operator's field of vision is flashed to indicate operation of the directional circuit.

It is accordingly among the objects of this invention to provide a novel directional signalling system for vehicles.

Another object is to provide such a system utilizing conventional vehicle lamp circuits.

A further object is to provide a novel switch and associated circuit elements, whereby conventional parking or stop lamp circuits may be utilized to provide flashing turn indication signals.

These and other objects, advantages and novel features of the invention will be apparent from the following description and the accompanying drawing. In the drawing.

Figure 1:
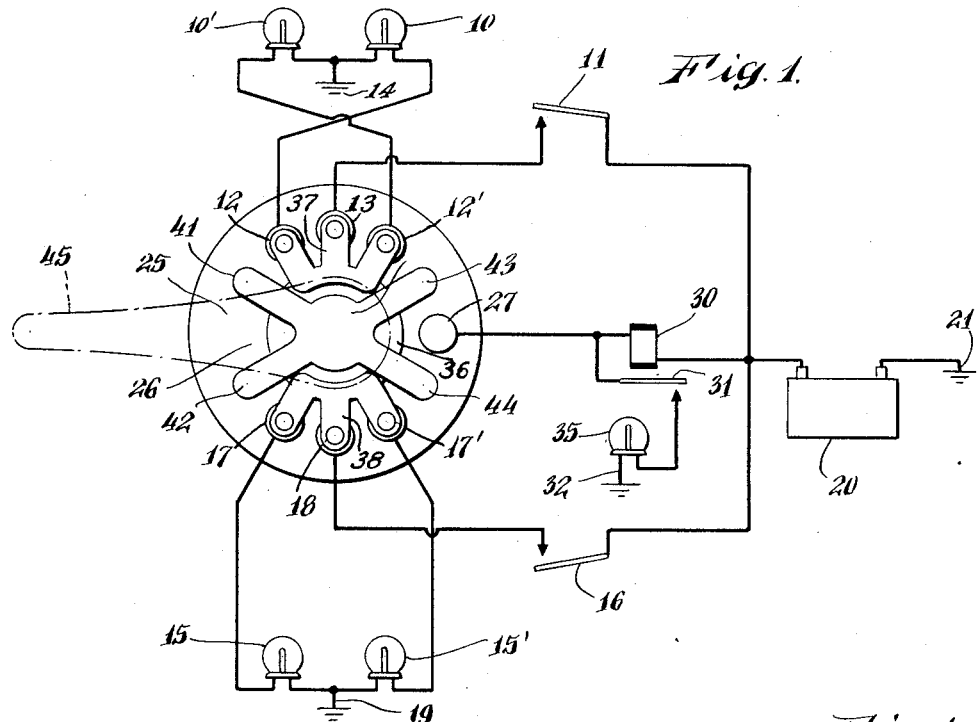
Fig. 1 is a schematic wiring diagram of the vehicle parking and stop lamp circuits embodying the invention.
Figure 2:
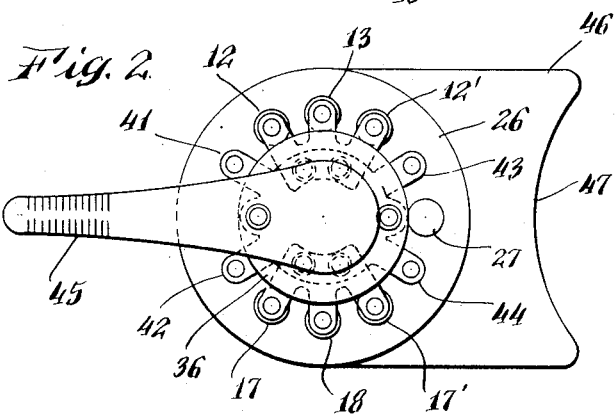
Fig. 2 is a plan view of a novel switch forming part of the invention.
Figure 4:
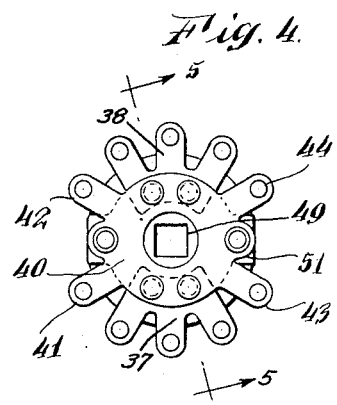
Fig. 4 is a bottom plan view of the movable contact member of the switch.
Figure 3:
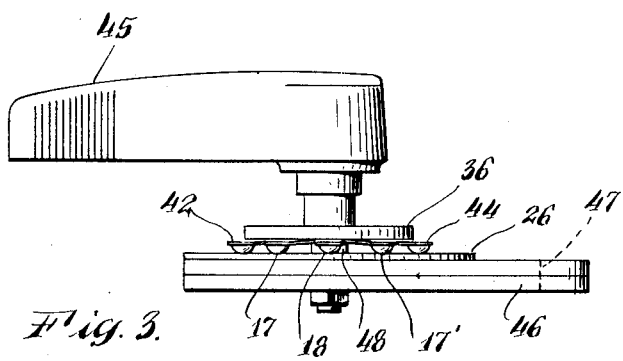
Fig. 3 is a side elevation view of the switch.
Figure 5:
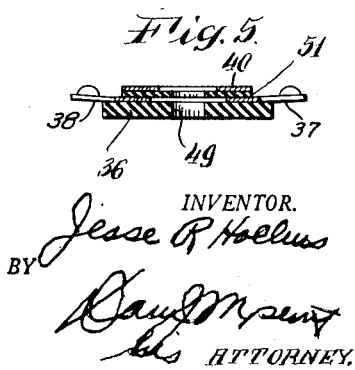
Fig. 5 is a transverse sectional view on the line 5—5 of Fig. 4.

Referring to Fig. 1, a vehicle marker lamp arrangement is illustrated as including parking lamps 10, 10', which may be on the front of the vehicle, a battery 20 grounded as at 21, a parking lamp control switch 11, and a brake actuated stop lamp switch 16. Switches 11 and 16 are connected in parallel to battery 20 and, in the present case, are connected to their respective lamp circuits through a novel, selectively operable switch 25.

Switch 25 includes an insulating plate 26 on which are mounted a first set of contacts 12, 12' and 13, and a diametrically opposite set of contacts 17, 17' and 18. A seventh contact 27 is mounted midway between contacts 12' and 17'. All of the contacts are arranged equidistant from the center of plate 26, and the distance of contact 27 from contacts 12', or 17', is twice the spacing of the contacts of each set of three.

Contacts 12 and 12' are connected to parking lamps 10 and 10' respectively, which are commonly grounded at 14. Contact 13 is connected to switch 11. Contacts 17 and 17' are connected to stop lamps 15 and 15', respectively, which are commonly grounded at 19. Contact 18 is connected to stop lamp switch 16.

Contact 27 is connected to battery 20 through a flasher unit 30 which has a movable contact 31 controlling the energization of a pilot or indicator lamp 35 grounded at 32. When flasher 30 is energized, contact 31 closes to energize lamp 35, which flashes in synchronism with operation of the flasher.

A second and smaller insulating plate 36 is rotatably mounted on plate 26 and carries diametrically opposite contact members 37 and 38 each having three arms arranged, in the position shown in Fig. 1, to engage contacts 12, 12', 13 and 17, 17', 18, respectively. Thus, in the position of Fig. 1, switch 11 is connected in circuit with both parking lights 10, 10' through contact member 37, and switch 16 is connected in circuit with both stop lamps 15, 15' through contact member 38. Consequently, in the illustrated "neutral" position of switch 25 in Fig. 1, closure of switch 11 will light both parking lamps 10, 10' and closure of switch 16 will light both stop lamps 15, 15'.

Plate 36 carries a second contact member 40 having a pair of diverging contact arms 41, 42, projecting from one side and a pair of diverging contact arms 43, 44 projecting from a diametrically opposite side. Arms 43, 44 are spaced midway betweeen contacts 12', 17', respectively, and contact 27. Arms 41, 42 are similarly angularly oriented and spaced.

An operating lever 45 is secured to plate 36 and, when the plate is rotated clockwise one step, arm 41 engages contact 12, arm 43 engages contact 27, and arm 44 engages contact 17'. Contacts 12' and 13 are interconnected through contact member 37 and contacts 17 and 18 are interconnected through member 38.

Accordingly, parking lamp 10 is energized over the following circuit: battery 20, flasher unit 30, contact 27, contact arm 43, contact member 40, contact arm 41 and contact 12. Stop lamp 15' is correspondingly energized through the flasher unit, contact arm 44 and contact 17'. Thus, the right-hand lamps 10, 15' are intermittently energized or flashed while the left-hand lamps 10', 15 are steadily lighted. As flasher circuit 30 is energized, switch 31 closes to light pilot lamp 35, which goes out when flasher unit 30 breaks its own circuit. Accordingly, a flashing "right turn" signal is provided, and operativeness of the circuit is indicated by pilot lamp 35.

A corresponding flashing of left-hand lamps 10', 15 is effected when switch 25 is turned one step counter-clockwise, with right-hand lamps 10, 15' burning steadily. The flashing lamps in this case give warning of a "left turn."

An actual embodiment of switch 25 is shown in Figs. 2 through 5. Base plate 26 is riveted to an insulating bracket 46 by contacts 12, 12', 13, 17, 17', 18 and 27, and bracket 46 has an arcuate end 47 arranged to engage a steering column. Bracket 46 has a circular aperture forming a bearing for a polygonal cross-section shaft 48 which fits a mating aperture 49 in plate 36. The latter has contact members 37, 38 and 40 riveted thereto, with contact member 40 being separated from contact members 37, 38 by a dielectric spacer 51.

As the directionally energized lamps are flashed, a contrasting signal is given even when the other lamps are burning, as the latter burn steadily. The arrangement is not limited to parking or stop lamps but may be used with a "fog" lamp circuit, if desired. The circuit arrangement and novel switch are simple and inexpensive, and utilize conventional lamp circuits.

While a specific embodiment of the invention has been shown and described in detail to illustrate the application of the principles thereof, it should be understood that the invention may be otherwise embodied without departing from such principles.

What is claimed is:

1. For use in a vehicle lamp signalling circuit arrangement, a selector switch including a fixed member carrying a pair of first contacts, a second contact intermediate said first contacts, and a third contact, said contacts being arranged around the circumference of a circle and said first contacts having equal predetermined angular spacings from said second contact and said third contact having twice such predetermined angular spacing from one first contact, a movable member rotatably mounted on said fixed member and carrying a first contact member having three projecting, angularly related fingers each engageable with a first or second contact in one position of said movable member, and a second contact member having at least three fingers, a pair of which have an angular spacing equal to twice said predetermined angular spacing and a third of which is diametrically opposite to one finger of said pair, one finger of said pair, in said one position of said movable member, having such predetermined angular spacing from a first contact whereby, in such one position, the fingers of said second contact member do not engage any of said fixed contacts, said movable member having a pair of second positions, each such positions being in predetermined angular spacing in either direction from such first position, and in each said second positions a pair of fingers of said first contact member engage one first contact and said second contact, and one finger of said second contact member engages said third contact, and another finger thereof engages the other first contact.

2. For use in a vehicle lamp signalling circuit arrangement, a selector switch including a fixed member carrying a pair of first contacts, a second contact intermediate said first contacts, a third contact, a pair of fourth contacts each diametrically opposite a first contact, and a fifth contact intermediate said fourth contacts, said contacts being arranged around the circumference of a circle and said first and fourth contacts having equal predetermined angular spacings from said second and fifth contacts, respectively, and said third contact being intermediate and spaced twice such predetermined angular distance from a first and fourth contact, a movable member rotatably mounted on said fixed member and carrying a first contact member having three projecting, angularly related fingers each engageable with a first or second contact in one position of said movable member, a second contact member having diametrically opposite pairs of fingers having angular spacings equal to twice said predetermined angular spacing, one finger of each pair, in said one position of said movable member, having such predetermined angular spacing from a first contact and the other finger of each pair having such predetermined angular spacing from a fourth contact, and a third contact member having three projecting, angularly related fingers each engageable with a fourth or fifth contact in such one position whereby, in such one position, the fingers of said second contact member do not engage any of said fixed contacts, said movable member having a pair of second positions, each such position being in predetermined angular spacing in either direction from such first position, and in each said second position a pair of fingers of said first contact member engage one first contact and said second contact, a pair of fingers of said third contact member engage one fourth contact and said fifth contact, and one finger of said second contact member engages said third contact, another finger thereof engages the other first contact and a third finger engages the other fourth contact.

3. A selector switch as claimed in claim 2 in which said first, second and third contact members are of conductive material, a plate of insulating material is interposed axially between said second contact member and said first and third contact members, and said contact members are fixedly secured to said plate.

JESSE R. HOLLINS.

REFERENCES CITED

The following references are of record in the file of this patent:

UNITED STATES PATENTS

| Number | Name | Date |
| --- | --- | --- |
| 1,374,440 | Foster | Apr. 12, 1921 |
| 1,717,629 | Sawyer | June 18, 1929 |
| 2,007,084 | Haines | July 2, 1935 |
| 2,036,676 | Bell | Aug. 7, 1936 |
| 2,086,959 | Rom | July 13, 1937 |
| 2,122,508 | Bell | July 5, 1938 |
| 2,458,323 | Volker | Jan. 4, 1949 |